Dec. 25, 1956
R. GEFFROY ET AL
2,775,511
OXYGEN GENERATOR
Filed Feb. 5, 1952
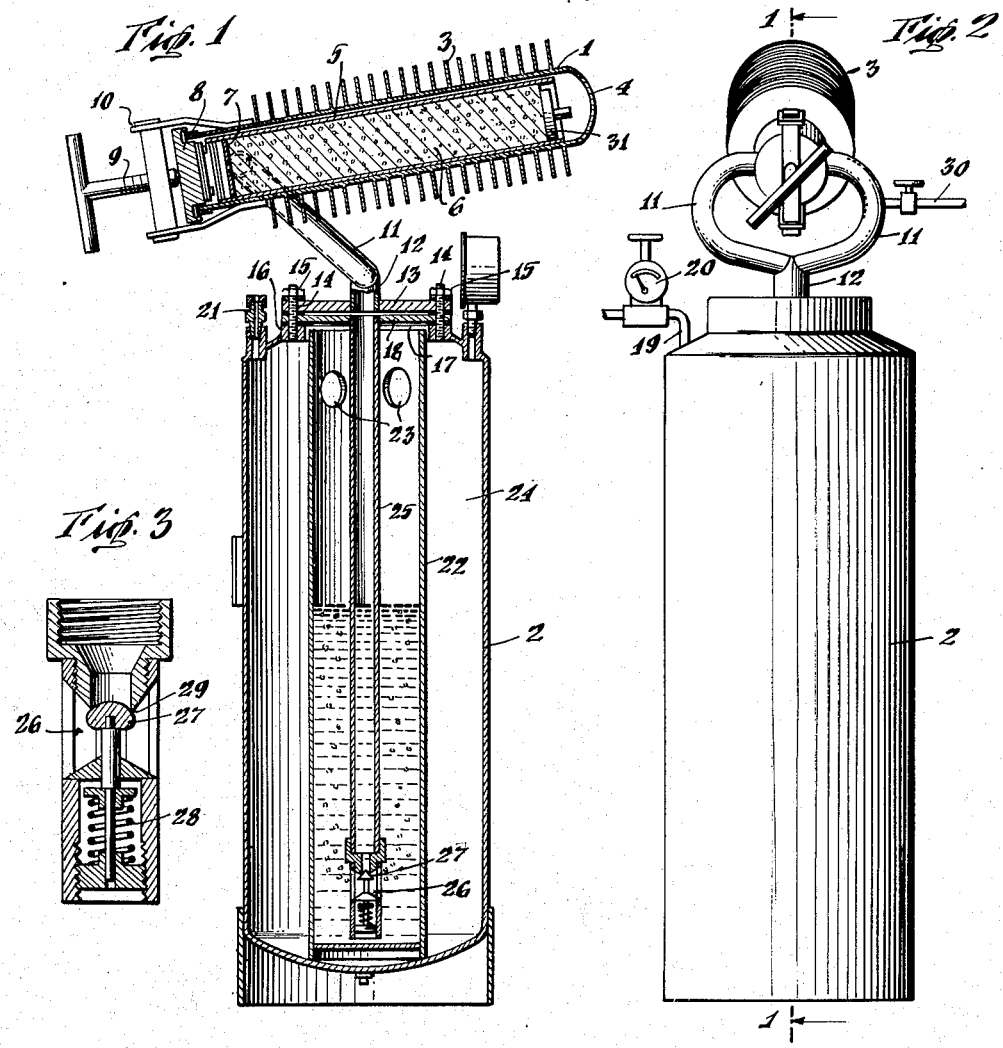
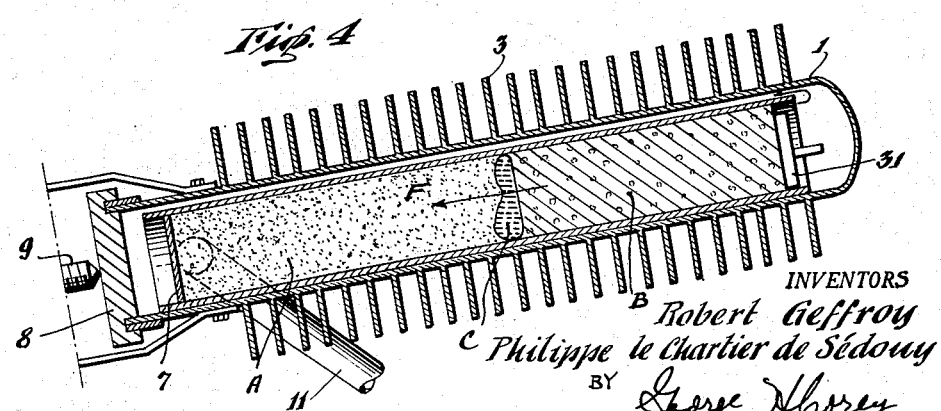
INVENTORS
Robert Geffroy
Philippe le Chartier de Sédouy
BY George Norey
ATTORNEY

United States Patent Office 2,775,511
Patented Dec. 25, 1956

2,775,511
OXYGEN GENERATOR

Robert Geffroy, Neuilly-sur-Seine, and Philippe le Chartier de Sedouy, Mesnil-le-Roi, France, assignors to Tradimex, Cooperative Commerciale, Bern, Switzerland, a corporation of Switzerland Application February 5, 1952, Serial No. 270,068

Claims priority, application France February 6, 1951

2 Claims. (Cl. 23—281)

This invention relates to improvements in the generation of oxygen from oxygen-yielding compositions, and more particularly concerns an improved oxygen-yielding composition that is usually and most conveniently prepared in the form of a preformed charge or "candle." The invention also includes the method of bringing about controlled liberation of oxygen from such compositions as desired and an oxygen generator for use in practicing such method.

The generation of oxygen by decomposition of chlorates and perchlorates has been known for many years, but many difficulties have always been experienced in controlling the reaction so as to insure that the decomposition will proceed in a safe and dependable manner. This problem is particularly serious when chlorate candles are used in portable oxygen-generating units used in mine rescue work and as an emergency source of oxygen in submarines and airplanes.

In order to supply heat to initiate and maintain a controlled propagation of the chlorate decomposition reaction from one end of the chlorate candle to the other, it is necessary to provide fuel for burning part of the liberated oxygen, and this customarily takes either the form of carbon, usually in the form of charcoal, or finely divided iron, such for example as the iron powder produced by the carbonyl process. It has also been customary to provide a catalyst such as manganese dioxide or barium peroxide to aid in the progress of the desired reactions.

Due to the large amount of heat liberated in the reactions, which would lead to a violent explosion if not controlled, and also to the need for some means serving to bind the ingredients of the composition into a coherent mass, it has also been customary to provide more or less inert material to serve as a filler, binder and heat absorbent. Usually this inert material has taken the form of asbestos fibers, glass fibers or the like.

It will be appreciated that the yield of useful oxygen per unit of weight of the candle will be reduced to the extent that inert materials are present and to the extent to which the chlorate oxygen is consumed in the combustion of the fuel component of the candle. Since it becomes important for the above mentioned as well as other uses of portable oxygen generators employing chlorate candles, to obtain the highest possible ratio of useful oxygen per unit of weight, a considerable effort has been put forth in recent years to provide chlorate candles of higher efficiency regarding oxygen output both with respect to the weight of the candle and its bulk. For example, U. S. Patent No. 2,469,414, discloses a candle regarded as constituting a considerable improvement over prior candles and yet the yied of useful oxygen per unit of weight is given as only 37% of the weight of the candle as compared with a theoretical yield of 45% based on the weight of the sodium chlorate constituent. This comparatively high yield of useful oxygen as compared with the prior art candles was achieved by reducing the fusible chlorate constituent to a molten state and pouring the mixture into molds. Such a procedure involves very careful control to bring the chlorate to the fusion point without decomposition and presents serious industrial hazards. In fact, notwithstanding the higher proportion of available oxygen present in sodium chlorate, as distinguished from potassium chlorate, and the relatively high cost of potassium chlorate and the alkali metal perchlorates, most of the prior workers have avoided the use of sodium chlorate as the oxygen-yielding constituent of chlorate candles because it was recognized that sodium chlorate has a much higher tendency to decomposition than do these other chlorate materials.

The present invention, insofar as it concerns the candle composition, is based on our discovery that it is possible to provide chlorate candles characterized by a substantially greater yield of useful oxygen per unit of weight than the best of those previously reported in the art and which at the same time do not require the presence of inert binding constituents, such as asbestos or glass fibers, which add to the bulk of the product. The candles of the present invention have the further advantage that they may be produced at less cost of materials and labor. They are also more stable in storage than candles wherein powdered iron or another easily oxidizable metal is used as the source of fuel since there is a tendency for slow oxidation of the powdered metal by the chlorate.

We have also found that it is possible to prepare chlorate candles that are sufficiently self-sustaining without the use of a special binder to permit of their being shipped and handled without series risk of breakage.

It is a further object of our invention to provide an improved oxygen generator adapted to bring about controlled withdrawal of excess heat liberated in the moving combustion zone, with utilization of part of such excess heat to bring about controlled preheating of the portions of the candle that are as yet unburned and bring their temperature gradually and progressively up to the ignition temperature as the combustion zone moves along the length of the candle. The generator also contains provisions for dissipating that part of the heat liberated that is not needed for sustaining the combustion reaction and for preheating the unburned portions of the candle.

The invention has for a further object an improved method of burning and preheating chlorate candles.

It is another of the invention to provide an oxygen generator with simple and effective means for purifying the liberated oxygen by separating out therefrom any contaminating gaseous combustion products.

It is a still further object of the invention to provide a portable oxygen generator which may be easily disassembled for shipping and which at the same time includes, besides the oxygen generating chamber proper, a suitable oxygen storage tank and an oxygen purifying unit disposed therein to form a compact and novel oxygen-generating system.

Still further advantages of the invention will become apparent from the appended description taken in conjunction with the accompanying drawing.

Fig. 1 is a vertical section taken along the line 1—1 of Fig. 2.

Fig. 2 is a side elevation of the oxygen-generating system comprising the oxygen generator per se, the associated oxygen purifying unit and an oxygen storage tank.

Fig. 3 is a vertical section on a larger scale of the check valve shown in Fig. 1.

Fig. 4 is a longitudinal section on an enlarged scale of the oxygen generator per se, showing a chlorate candle disposed within an inner cartridge type container and undergoing decomposition therein.

As shown by way of example in the drawing, the generator system comprises the retort 1 and the oxygen storage tank 2. The retort 1 is shown as a steel cylinder provided with cooling fins 3 and is mounted in an inclined relation to the horizontal, preferably at an angle of 5° to 20°. As shown, the retort is closed at the upper end 4 and is open at the lower end to receive an inner cylindrical container or cartridge 5 adapted to closely receive one or more chlorate candles 6. This cartridge 5 is closed at its lower end 7 and has an outer diameter only a little smaller than the inside diameter of the retort 1. However, it is important to provide a sufficient space between the outer surface of the wall of the cartridge and the inner surface of the wall of the retort so that the liberated oxygen and associated combustion gases may pass through the space between these walls without setting up any pronounced back pressure. The cartridge is preferably made of stainless steel or another suitable corrosion resistant and heat conducting material. The retort 1 is closed at its lower end by a plug 8 adapted to establish a tight seal for the open end of the retort and to be held tightly in place by means of a screw 9 mounted in a bracket 10 adapted to be pivoted away from alignment with the open end of the retort 1 when the cartridge 5 is to be inserted or withdrawn for introduction of a fresh charge.

As shown, the retort 1 is supported through its connections with the branch pipes 11 of the gas outlet pipe 12 on the oxygen storage tank 2. The branch pipes 11 communicate with the retort space on opposite sides and at positions well above the bottom of the space defined between the cartridge 5 and the inner surface of the retort wall. This arrangement reduces the amount of dust likely to be drawn into the gas outlet pipe and facilitates the deposition of dust carried by the evolved oxygen within the space between the cartridge and the retort whence it may be withdrawn when the candle charge is being renewed.

As shown, the gas outlet pipe 12 is welded at its lower end in a cover plate 13 which is secured by means of stud bolts 14 and nuts 15 to an annular seat 16 defining an opening 17 at the top of the tank 2 through which a gas purifying unit, hereinafter described, may be inserted and withdrawn as desired. A second cover plate 18 is interposed between the cover plate 13 and the seat 16 and tight seals are made between the adjacent surfaces of the cover plate 13 and the plate 18 on the one hand and between the seat 16 and the plate 18 on the other.

The oxygen storage tank 2 is so constructed as to withstand a predetermined gas pressure and is provided with a suitable connection 19 for delivering oxygen past the pressure gauge 20 as desired. A safety valve 21 is also provided. As shown, a vertically extending inner container 22 is provided within the storage tank and is preferably removably secure to the tank in any suitable manner. This inner container 22 preferably extends substantially throughout the vertical length of the tank and is provided with orifices 23 adjacent the upper end through which purified oxygen may pass to the oxygen storage space 24. The inner container 22 is made of suitable corrosion resistant material or may consist of ordinary steel covered by a corrosion resistant material such as lead, enamel, glass, or an appropriate plastic.

The plate 18 supports a down pipe 25, serving as a continuation of the pipe 12, and which carries at its lower end a check valve 26, better seen in Fig. 3, which comprises a plug 27 which is urged upwardly by a spring 28 against a seat 29. Due to this arrangement, the valve and the seat are always immersed in the liquid disposed within the container 22, so that when the valve is opened any solid particles carried over with the gases from the retort 1, and which consists mainly of chloride particles are either readily dissolved in the liquid or washed away from the valve surfaces and thus do not interfere with the tightness of the seal established by the valve, the primary function of which is to maintain the oxygen gas under pressure in the tank 2 in case the retort is opened. The gas entering through the pipe 25 flows past the valve 26 and passes upwardly through the liquid disposed in the container 22. The liquid may consist of a solution of sodium hydroxide or another appropriate chemical or mixture of chemicals suitable for absorbing carbon dioxide and any other gaseous impurities carried by the gas.

A valve controlled vent pipe 30 is provided and may be connected to one of the branch pipes 11 for voiding air contained in the system at the beginning of an oxygen generating operation. As soon as the air has been displaced from the retort and the pipe connections, the valve is closed and the oxygen caused to pass through the purifying unit to the gas storage space 24. A metal plate or disk 31 is also provided for insertion within the reaction chamber 5 at the upper end of the candle for a purpose more particularly described hereinafter. The cartridge or reaction chamber 5 will, of course, be appropriately dimensioned to receive candles that are to be burned therein.

The operation of the generator will now be described:
The chlorate candle, preferably of the composition and diameter hereinafter stated, is inserted within the cartridge 5. The fit should be sufficiently tight so that there is contacting engagement between the candle and the walls of the cartridge 5 substantially throughout their coextensive areas so that there will be little or no void space between the two that will hinder conduction of heat between them. Should the candle become broken into pieces in the course of its introduction into the cartridge 5, it should be rejected since the smooth operation of the burning and preheating is dependent on the presence of a substantially continuous and coherent body of the chlorate composition.

In order to initiate the ignition of the candle, a small portion of the candle composition near the center of the exposed end thereof may be reduced to powder by digging out a small cavity in the end with a suitable tool. The loose mass of powder may then be ignited by a taper or other suitable means. Initial ignition will usually be attended by emission of a slight smoke, accompanied by a mild crackling and sparkling. As soon as the reaction is started it is preferable to insert the metal disk 31 and press it firmly against the mass to retain the ignited material in contact with the as yet unignited body of the candle. This disk should be somewhat smaller than the cross-sectional area of the cartridge in order that oxygen and combustion gases evolved during the reaction may pass outwardly past the disk into the outer space of the retort. During this interval and until all of the air originally present in the retort and the connecting piping has been driven off, the valve in the pipe 30 will remain open.

The reaction propagates itself along the candle in the direction of the arrow F (Fig. 4), where A represents the intact charge, B the solidified slag remaining after ignition of a part of the charge, and C the pasty slag adjacent the reaction zone. Since the slag has been restrained from the outset of the operation by the presence of the disk 31 from moving out of contact with the unignited portion of the charge, it will be understood that heat evolved in the reaction is always immediately available at the ignition zone to bring the preheated charge to the reaction temperature. At the same time, since the slag is in direct and more or less intimate contact with the walls of the cartridge or reaction chamber proper, there is bound to be a considerable amount of direct heat transfer from the hot reaction zone to the walls of the container and then along those walls both upwardly and away from the reaction zone and downwardly along the walls surrounding the as yet unignited portions of the candle, with the result that heat required for preheating the unburned portions to the ignition temperature is transferred to such portions and at the same time a part of the heat is led away where it may be transferred to the outer walls of the retort and dissipated with the aid of the cooling fins or by other suitable means of cooling associated with retort.

It will also be understood that the oxygen liberated in the reaction zone and passing therefrom through the porous slag mass toward the upper end of the reaction chamber will carry with it a very considerable portion of the evolved heat. This heat will in part be returned to the system through contact of the oxygen with the outer surfaces of the walls of the reaction chamber and thence by conduction from those walls to the unignited portion of the charge, and in part will be transferred to the walls of the retort and dissipated. It will be seen, therefore, that by appropriately proportioning the diameter of the candle with reference to the composition of the candle and to the dimensions of the significant elements of the generator, including the reaction chamber or cartridge 5, the retort and the cooling means employed, it becomes possible to utilize a suitable part of the excess heat evolved in the chlorate reaction in supplying preheat for the charge and at the same time to withdraw from the system that part of the heat that is not needed and which might otherwise lead to overheating and explosive action. With a given selection of the candle composition and a given apparatus constructed with reference to the heat evolving capabilities of the particular candle composition, it becomes possible to insure reliable and satisfactory operation of the oxygen generator for indefinite periods, and with a minimum loss of the available oxygen for burning fuel to supply heat to maintain the oxygen generating reaction.

By way of example and using a candle of the composition hereinafter more particularly described and having a length of about 16 inches, a diameter of $3\frac{1}{16}$ inches, and weighing about $7\frac{1}{2}$ lbs., it is possible in a period of 15 minutes to produce about 35 cubic feet of oxygen of a 98% purity under a pressure of about 16 to 18 atmospheres. For separating the carbon dioxide and chlorine impurities carried over with the gas, we find that a purifying liquid composed for example of 0.35 cubic feet of a water solution containing 35 ozs. of NaOH and 7 ozs. of sodium hyposulfite will purify approximately 360 cubic feet of oxygen. In other words, the purifying unit charged with such a quantity and proportions of solution will not need to be recharged during burning of about 10 chlorate candles of the dimensions above specified.

When operating under the conditions above described, we find that best results are obtained when the external cooling of the retort is so regulated as to insure that the temperature of the retort at the upper end (4) is about 392° F. and the temperature at the opposite end of the retort reaches a maximum of about 167° F. and then only near the end of the reaction. It will be understood that air cooling is facilitated by disposing the retort as near to the horizontal position as is consistent with satisfactory progress of the reaction promoted by the pressure of the liberated slag against the unignited face of the charge. Water cooling may be substituted and will be equally as efficient if the water temperature is maintained at about 140°–212° F. However, resort to water cooling usually involves more complicated apparatus and either provision for constant circulation of the water or draining of the heated water and its replacing at the beginning of each new run.

As pointed out earlier herein, we have found that the composition and proportions of the ingredients making up the chlorate candle are very important aspects of the invention and that when the candle is appropriately formulated as to composition, having regard to the diameter of the candle and the construction of the oxygen generator in which it is to be used, it is possible to provide chlorate candles at lower cost and giving a higher oxygen yield than any compositions previously disclosed in the art.

More specifically, we have found that it is possible to prepare preformed oxygen-yielding chlorate candles that are satisfactorily self-sustaining during handling and which are capable of being burned under practical conditions of control without danger of explosions and without recourse to inert binding materials, such as asbestos fibers and glass fibers and which at the same time contain sodium chlorate as the oxygen-yielding component.

The candle compositions of our invention are preferably made up of a crushed and homogeneous mixture of sodium chlorate, charcoal and manganese dioxide, the charcoal usually comprising between 1.5 and 3% of the weight of the mass, the proportion of manganese dioxide between 4 and 8% and the rest being sodium chlorate.

Our investigations also indicate that the degree of granulation of the individual ingredients is a factor that should be given consideration in order to insure the best results. We find that the charcoal should be reduced to a fineness such that all particles will pass a 40 mesh sieve and about 80% will pass an 80 mesh sieve. Similarly the sodium chlorate and the manganese dioxide should be sufficiently fine so that all particles will pass through a 20 mesh sieve; i. e., a sieve wherein the distance between the meshes is about $\frac{3}{64}''$.

We have also found that the optimum proportion of charcoal varies somewhat with the kind of charcoal; that is, the source from which it is derived. For example, we have found that with pine charcoal the proportion may be kept between 2 and 2.5% whereas when using hard charcoal (oak, beech, etc.), the proportion preferably should be between 2.5 and 3%.

We have also found that in contrast with potassium chlorate, for example, sodium chlorate offers the definite advantage that a composition containing it may be bonded into a coherent self-sustaining mass with the use of a lower proportion of water and that during drying the candles show little tendency to warp and when dried are much less brittle than are candles formulated with the use of potassium chlorate. We believe that this improved but not previously appreciated result is attributable in part to the greater water solubility of sodium chlorate which insures that a larger proportion of the sodium chlorate is dissolved during the mixing of the granular materials of the composition preparatory to molding and in part to the fact that the dissolved sodium chlorate is deposited as a binder or cement during the drying of the candles, and in so doing forms crystals that exert a much stronger bonding action than would be exerted by a similar proportion of the potassium chlorate which crystallizes in a different form than sodium chlorate.

We have also observed that the oxygen produced according to our process and with the use of sodium chlorate candles prepared as above described does not contain any appreciable proportion of carbon monoxide. At the same time we note that a part of the manganese dioxide content of the slag is present as MnO, thus indicating that any carbon monoxide that may have formed originally in the reaction zone has become transformed to carbon dioxide through contact with $MnO_2$ in passing upwardly through the heated slag.

We have previously pointed out that consideration should be given to the diameter of the candle and that this should be regulated with regard to the size of the reaction chamber of the oxygen generator and also with regard to the provisions made for dissipating excess heat given off in the burning of the candle. Generally speaking, we find that best results are obtained when the diameter of the candle is kept within the range $2\frac{5}{16}''$ and $3\frac{5}{16}''$ and preferably at about $2\frac{9}{16}''$ when the candle is made up with proportions of charcoal as fuel and sodium chlorate within the preferred range hereinbefore disclosed. If the diameter is smaller than about $2\frac{5}{16}''$ the amount of heat liberated is too small with reference to the cooling area to insure continued combustion. On the other hand, if the diameter exceeds about $3\frac{5}{16}''$ the ratio between the amount of heat liberated and the cooling area becomes too high, leading to excessive temperatures and a too violent reaction.

Although we have specified above a range of proportions of charcoal of $1\frac{1}{2}$ to 3% and we find in fact that it is difficult to initiate the reaction with a candle containing less than 2% of charcoal, we have also found that once the reaction has become well established and enough heat has been developed to warm up the retort and the walls of the reaction chamber sufficiently to supply a sufficient amount of preheat to the unignited portions of the candle, it is possible to maintain the reaction with candles containing as low as 1% of charcoal. Therefore, it becomes possible to load the generator with several candles one of which would contain charcoal in the proportion of say 2% and the rest would contain around 1% of charcoal. Of course, the candle containing 2% would be placed in position to first become ignited. Alternatively, a single candle could be used in which the proportion of charcoal is higher at one end than at the other.

It will be understood that the proportions of charcoal, catalyst and sodium chlorate may be varied somewhat from the optimum set out above with variations in the degree of granulation. Within limits less fuel will be required to initiate the reaction when finer particle sizes of the fuel and sodium chlorate are used, and conversely, more fuel will be required when using coarser material. If the proportion of charcoal is increased a point will be reached where the temperature becomes too high and the reaction will become too vigorous to permit of proper control. Such a condition will result if the proportion of charcoal is increased above 3% and the fineness of the charcoal and of the sodium chlorate remain the same as specified in the preferred example above.

Although the invention has been described with particular reference to the use of the apparatus and the arrangements for preheating of the candle by heat interchange in connection with the burning of sodium chlorate candles, it will be understood that the apparatus and the method of burning chlorate candles disclosed herein are applicable in burning candles made up with other oxygen-yielding materials, such as potassium chlorate and the perchlorates, and these aspects of the invention are to be so broadly construed.

We claim:

1. Apparatus for generating oxygen from thermally decomposable oxygen-yielding candles, comprising a tubular retort, means for normally supporting said retort in inclined relation to the horizontal, cooling means in heat transfer relation to the exterior wall of said retort substantially throughout the length thereof, an outlet pipe connected to said retort adjacent the lower end thereof, means defining an inner tubular reaction chamber within said retort for receiving a candle in close fitting relation therein, said reaction chamber being open at its upper end and having imperforate side walls spaced from the walls of said retort to define therebetween a passage through which oxygen liberated in said reaction chamber may travel downwardly therethrough in heat exchanging relation to the walls of said retort and said reaction chamber to said outlet pipe, said imperforate side walls being formed of a heat conductive corrosion resistant material.

2. An oxygen generator comprising a tubular retort normally closed at both ends and provided with an oxygen lead-off connection adjacent one end, an elongated metallic cartridge casing of substantially smaller cross-section than said retort, said casing being open at one end and having imperforate side walls, said casing being fitted within said retort in spaced relation to at least a large part of the periphery of the side walls thereof with the open end of said casing positioned remotely from said oxygen lead-off connection, said casing receiving in closely fitting relation a thermally decomposable oxygen-yielding candle, and said casing defining between itself and the side walls of said retort a passage from the open end of said casing to said lead-off connection through which oxygen liberated during the thermal decomposition of said candle is conducted to said lead-off connection.

References Cited in the file of this patent

UNITED STATES PATENTS

| | | |
|---|---|---|
| 393,737 | Arnold | Dec. 4, 1888 |
| 739,723 | Rosenberg | Sept. 22, 1903 |
| 874,596 | Janet | Dec. 24, 1907 |
| 1,001,873 | Mauran et al. | Aug. 29, 1911 |
| 1,025,191 | Janbert | May 7, 1912 |
| 1,852,786 | Muller | Apr. 5, 1932 |
| 2,004,243 | Hloch | June 11, 1935 |
| 2,085,586 | Hotchkiss | June 29, 1937 |
| 2,114,142 | Hloch | Apr. 12, 1938 |
| 2,170,052 | Heim et al. | Aug. 22, 1939 |
| 2,245,495 | Pemble | June 10, 1941 |
| 2,320,149 | Lohausen | May 25, 1943 |
| 2,494,131 | Jackson | Jan. 10, 1950 |
| 2,558,756 | Jackson et al. | July 3, 1951 |